United States Patent
Lee et al.

(10) Patent No.: US 10,550,022 B2
(45) Date of Patent: Feb. 4, 2020

(54) SEWAGE/WASTEWATER TREATMENT SYSTEM USING GRANULAR ACTIVATED SLUDGE AND MEMBRANE BIO-REACTOR AND SEWAGE/WASTEWATER TREATMENT METHOD USING THE SAME

(71) Applicant: DOOSAN HEAVY INDUSTRIES & CONSTRUCTION CO., LTD., Gyeongsangnam-do (KR)

(72) Inventors: Younggeun Lee, Gyeonggi-do (KR); Hyungkeun Roh, Seoul (KR); Gunmyung Lee, Daegu (KR); Jaeho Ho, Tampa, FL (US)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 451 days.

(21) Appl. No.: 15/170,350

(22) Filed: Jun. 1, 2016

(65) Prior Publication Data

US 2017/0203984 A1    Jul. 20, 2017

(30) Foreign Application Priority Data

Jan. 18, 2016   (KR) .................. 10-2016-0006000
Apr. 12, 2016   (KR) .................. 10-2016-0044779

(51) Int. Cl.
*C02F 3/12* (2006.01)
*C02F 3/00* (2006.01)

(52) U.S. Cl.
CPC .......... *C02F 3/1268* (2013.01); *C02F 3/1205* (2013.01); *C02F 3/1278* (2013.01);
(Continued)

(58) Field of Classification Search
None
See application file for complete search history.

(56) References Cited

U.S. PATENT DOCUMENTS

2008/0087607 A1*   4/2008   Langlais ............ B01D 21/0012
                                                    210/704
2014/0097132 A1*   4/2014   Ho .................... B01D 65/02
                                                    210/150

FOREIGN PATENT DOCUMENTS

CN          105129974 A      12/2015
JP          01-203004 A       8/1989
(Continued)

OTHER PUBLICATIONS

Machine Translation of KR-10-20010096080, Kim et al., KR 10020010096080, published 2001, 10 total pages.*
(Continued)

*Primary Examiner* — Jonathan M Peo
(74) *Attorney, Agent, or Firm* — Invenstone Patent, LLC (57) ABSTRACT

The present disclosure relates to a sewage/wastewater treatment system using granular activated sludge and a membrane bio-reactor and a sewage/wastewater treatment method using the same that are configured to effectively remove pollutants contained in raw water through a granulation tank in which the granular activated sludge is contained and to allow the raw water to be filtered through movable membranes located on the upper portion of the granulation tank. The system includes: an indirect aeration tank adapted to supply air thereto to allow dissolved oxygen contained in raw water to reach a saturation concentration; a granulation tank adapted to allow floating microorganisms contained in the treated water passing through the indirect aeration tank to be granulated and having a sludge blanket formed thereon; and movable membranes located on the upper portion of the granulation tank in such a manner as to be movable in the granulation tank.

15 Claims, 5 Drawing Sheets

(52) U.S. Cl.
    CPC ...... *C02F 3/1284* (2013.01); *C02F 2003/001* (2013.01); *C02F 2203/00* (2013.01)

(56) References Cited

FOREIGN PATENT DOCUMENTS

| | | |
|---|---|---|
| JP | 03-080993 A | 4/1991 |
| JP | 03-188926 A | 8/1991 |
| JP | 5-9697 U | 2/1993 |
| JP | 07-185269 A | 7/1995 |
| JP | 09-070599 A | 3/1997 |
| JP | 10-128082 A | 5/1998 |
| JP | 2003-094084 A | 4/2003 |
| JP | 2007-532297 A | 11/2007 |
| KR | 10-2001-0096080 | 11/2001 |
| KR | 10-0961452 B1 | 6/2010 |
| KR | 10-2010-0098444 | 9/2010 |
| KR | 10-1336988 B1 | 11/2013 |
| KR | 10-2015-0096647 | 8/2015 |
| WO | 2005100264 A2 | 10/2005 |

OTHER PUBLICATIONS

Korean Office Action issued by Korean Patent Office dated Apr. 3, 2017 corresponding to KR 10-2016-0006000.

Japanese Office Action issued by Japanese Patent Office dated Jan. 29, 2017 corresponding to JP 2016-097594.

A Chinese Office Action dated Nov. 15, 2019 in connection with Chinese Patent Application No. 201610355286.4 which corresponds to the above-referenced U.S. application.

\* cited by examiner

SEWAGE/WASTEWATER TREATMENT SYSTEM USING GRANULAR ACTIVATED SLUDGE AND MEMBRANE BIO-REACTOR AND SEWAGE/WASTEWATER TREATMENT METHOD USING THE SAME

CROSS-REFERENCE TO RELATED APPLICATIONS

This application claims priority to Korean Application No. 10-2016-0006000, filed Jan. 18, 2016, and Korean Application No. 10-2016-0044779, filed Apr. 12, 2016, the contents of each of which are incorporated herein in their entirety.

BACKGROUND

The present disclosure relates to a sewage/wastewater treatment system using granular activated sludge and a membrane bio-reactor and a sewage/wastewater treatment method using the same that are configured to effectively remove pollutants contained in raw water through a granulation tank in which the granular activated sludge is contained and to allow the raw water to be filtered through movable membranes located on the upper portion of the granulation tank, thereby conducting advanced water treatment for tap water for miscellaneous.

Generally, an activated sludge system, which is commonly used as biological sewage/wastewater treatment equipment, needs an aerobic tank for oxidizing organic matters by using floating microorganisms and a secondary clarifier for conducting solid-liquid separation so that treated water is separated from the floating microoragnisms.

However, the facility for the secondary clarifier is complicated in the mechanical device thereof, sensitive in the hydraulic load thereof, and causes various problems like sludge rising, and recently, accordingly, a variety of water treatment technologies wherein membranes are submerged in the aerobic tank using the activated sludge system (which is called a membrane bio-reactor MBR) have been developed and suggested.

The MBR system is configured wherein water treatment is conducted with a single or continuous modified activated sludge processes so as to effectively remove the pollutants contained in sewage and wastewater, and in this case, microfiltration MF membranes or ultrafiltration UF membranes are used as physical barriers for complete solid-liquid separation. The UF and MF membranes are submerged in the interior of the bio-reactor or in the exterior of the bio-reactor.

If the membranes are submerged and operated for the replacement of the clarifier in the activated sludge system, however, the activated sludge may be broken by means of the sticky characteristics thereof and the aeration, and thus, the surfaces of the membranes may be clogged with the fine particles of the activated sludge, so that the membranes should be often cleaned. Due to the clogging of the membranes, accordingly, there are many difficulties in actually applying the membrane bio-reactor to the water treatment system.

So as to prevent the membranes from being clogged due to the broken activated sludge, there is a sludge granulation method using self-granulation characteristics of microorganisms. Representatively, there are an upflow anaerobic sludge blanket method conducted through upflow under an anaerobic condition and a granulation method conducted under an aerobic condition. Now, the granulation method under the aerobic condition will be in detail explained.

If the microorganisms of the aerobic tank for the activated sludge are contacted with each other at a slow speed by means of an agitator, the contacts between the activated sludge are generated by means of the bridge reaction of the activated sludge to allow the activated sludge to bind with each other, so that the activated sludge becomes granulated through self-granulation thereof, without having any media, and the granular activated sludge is excellent in the submerging capability and compact in size, thereby reducing the volume occupied by the reactor tank and requiring no clarifier.

The activated sludge granulation device largely includes an indirect aeration tank and a granulation tank, wherein the indirect aeration tank introduces water from the upper portion of the granulation tank, excessively aerates the water introduced thereinto, and introduces the water in which dissolved oxygen is abundant into the granulation tank, as upward flow, so as to allow the sludge in the granulation tank to be maintained in an aerobic condition, and the granulation tank is adapted to allow the contacts between the sludge to be generated through the vortexes caused by the hydrodynamic force generated from the indirect aeration tank toward the granulation tank or through an agitator disposed in the granulation tank.

A sewage/wastewater treatment systems and methods using granular sludge is disclosed in Korean Patent No. 1336988 (issued on Dec. 5, 2013), and the system is configured wherein anaerobic granular sludge, first aerobic granular sludge, second aerobic granular sludge and nitrification granular sludge are injected correspondingly into an anaerobic tank, anoxic tank, a first aerobic tank and a second aerobic tank, each of them having a separation plate, thereby greatly improving the treatment efficiencies of the pollutants such as organic matters, nitrogen, phosphate and so on in the sewage and wastewater.

However, the conventional system is configured to allow the treated water to pass through a clarifier in which membranes are additionally disposed to separate and discharge the floating microorganisms contained in the treated water passing the aerobic tank, thereby disadvantageously increasing the installation area and requiring separate facilities such as an air collection device, a pump, and a pipe for cleaning the membranes.

BRIEF SUMMARY

Accordingly, the present disclosure has been made in view of the above-mentioned problems occurring in the related art, and it is an object of the present disclosure to provide a sewage/wastewater treatment system using granular activated sludge and a membrane bio-reactor that is configured to effectively remove pollutants contained in raw water through a granulation tank in which the granular activated sludge is contained and to allow the raw water to be filtered through movable membranes located on the upper portion of the granulation tank, thereby reducing or minimizing the installation area thereof, improving the treatment efficiencies of pollutants such as organic matters, nitrogen, phosphate and so on, and conducting advanced water treatment.

It is another object of the present disclosure to provide a sewage/wastewater treatment system using granular activated sludge and a membrane bio-reactor and a sewage/wastewater treatment method using the same that are configured to provide agitation means in a granulation tank so as to apply given agitating effects to a sludge blanket formed inside the granulation tank, thereby preventing the sludge blanket from being attached to the bottom surface of the granulation tank, thereby reducing or minimizing the installation cost and the operating cost.

To accomplish the above-mentioned objects, according to a first aspect of the present disclosure, there is provided a sewage/wastewater treatment system using granular activated sludge and a membrane bio-reactor, the system including: an indirect aeration tank adapted to supply air thereto to allow dissolved oxygen contained in raw water to reach a saturation concentration; a granulation tank adapted to allow floating microorganisms contained in the treated water passing through the indirect aeration tank to be granulated and having a sludge blanket formed thereon; and movable membranes located on the upper portion of the granulation tank in such a manner as to be movable in the granulation tank.

According to the present disclosure, desirably, the granulation tank has an agitator adapted to apply given agitating effects to the sludge blanket to prevent the sludge blanket from being attached to the inner wall of the bottom surface thereof, so that the granulation in the granulation tank is conducted out by gelatin as by-products generated by the contacts of the floating microorganisms, and the granulation is accelerated through a first hydrodynamic force caused by the treated water conveyed from the indirect aeration tank and a second hydrodynamic force caused by the agitation means of the granulation tank.

According to the present disclosure, desirably, the agitator is disposed inside the granulation tank.

According to the present disclosure, desirably, the movable membranes are low pressure microfiltration MF membranes or ultrafiltration UF membranes.

According to the present disclosure, desirably, the sewage/wastewater treatment system further includes a partitioning wall formed to divide the interior of the granulation tank into upper and lower portions so as to reduce or prevent the turbulent flows generated from the movements of the movable membranes in the granulation tank from moving to the sludge blanket and to maintain the shape of the sludge blanket, and the partitioning wall is a porous member or inclined plates arranged at given intervals.

According to the present disclosure, desirably, the sewage/waste water treatment system further includes a reciprocating device adapted to reciprocate the movable membranes forward and backward or left and right in the granulation tank so as to reduce the contamination of the movable membranes, and the reciprocating device includes: sliding frames reciprocatingly connected to the movable membranes; rotors connected to the sliding frames by means of shafts and performing rotational motions; and a motor for rotating the rotors and converting the rotational motions of the rotors into the reciprocating motions of the sliding frames through the shafts connected to the sliding frames. Desirably, the reciprocating device further includes buffers located between the sliding frames and the shafts to reduce the impact loads generated therefrom, and the sliding frames are varied along sliding rails on which linear bearings and shaft-supports are located.

According to the present disclosure, desirably, the movable membranes continuously move during supernatant liquid in the granulation tank is filtered or selectively move if required to prevent the contamination thereof.

According to the present disclosure, desirably, the agitation means is adapted to agitate the sludge blanket in the granulation tank and at the same time to drive the movable membranes in the granulation tank, and the agitation means includes an auxiliary water circulation line adapted to allow the treated water passing through the sludge blanket to be circulated again from the upper portion of the granulation tank to the lower portion thereof. At this time, the treated water is circulated through the auxiliary water circulation line by means of the force generated from the movements of the movable membranes.

To accomplish the above-mentioned objects, according to a second aspect of the present disclosure, there is provided a sewage/wastewater treatment method using granular activated sludge and a membrane bio-reactor, the method comprising the steps of: supplying air to raw water containing pollutants therein to aerate the raw water; granulating floating microorganisms contained in treated water in which dissolved oxygen is in a saturated state through the aeration step; and filtering supernatant liquid except the granulated sludge in the granulation step through movable membranes and discharging the supernatant liquid to the outside, wherein in the granulation step, a sludge blanket formed by the granulated floating microorganisms is agitated through agitation means.

According to the present disclosure, desirably, the granulation in the granulation step is conducted by gelatin as by-products generated by the contacts of the floating microorganisms, and the granulation is accelerated through a first hydrodynamic force caused by the treated water conveyed through the aeration step and a second hydrodynamic force caused by the agitation means in the granulation step.

According to the present disclosure, desirably, a granulation tank, in which the granulation step and the filtration step are carried out, further comprises a partitioning wall formed to divide the interior of the granulation tank into upper and lower portions so as to reduce or prevent the turbulent flows generated from the movements of the movable membranes in the granulation tank from moving to the sludge blanket and to maintain the shape of the sludge blanket.

According to the present disclosure, desirably, the second hydrodynamic force is formed by means of an agitator disposed inside the granulation tank or an auxiliary water circulation line adapted to allow the treated water passing through the sludge blanket to be circulated again from the upper portion of the granulation tank to the lower portion thereof, and the partitioning wall is a porous member or inclined plates arranged at given intervals.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Hereinafter, an explanation on a combined sewage/wastewater treatment system using granular activated sludge and a membrane bio-reactor according to preferred embodiments of the present disclosure will be in detail given with reference to the attached drawings. Before the description, the terms or terminology used in the description and claims of the present disclosure are for the purpose of describing particular embodiments only and are not intended to be limiting.

In the description, when it is said that one element is described as "includes" any component, one element further may include other components unless no specific description is suggested.

Terms, such as the first and the second may be used to describe various elements, but the elements should not be restricted by the terms. The terms are used to only distinguish one element from the other element. For example, a first element may be named a second element, and in the same manner as above, a second element may be named a first element.

Even if not mentioned specifically in the description, 'raw water' means sewage or wastewater in which a variety of pollutants are contained so that water treatment is needed. Further, 'treated water' means the raw water passing through each stage, step and device, 'return water' is a portion of raw water returned to its pre-stage, step or device as, for example, through a treated water discharge line 450, and 'granulation' means a phenomenon wherein microorganisms contained in the raw water bind to each other to form shapes of granules. Hereinafter, it should be understood that the granulation is not distinguished from 'coagulation' or 'flocculation' that means a phenomenon in which individual particles bind to each other through their contact to form big aggregates, but it should be understood to have large meaning including the coagulation or flocculation.

Figure 1:
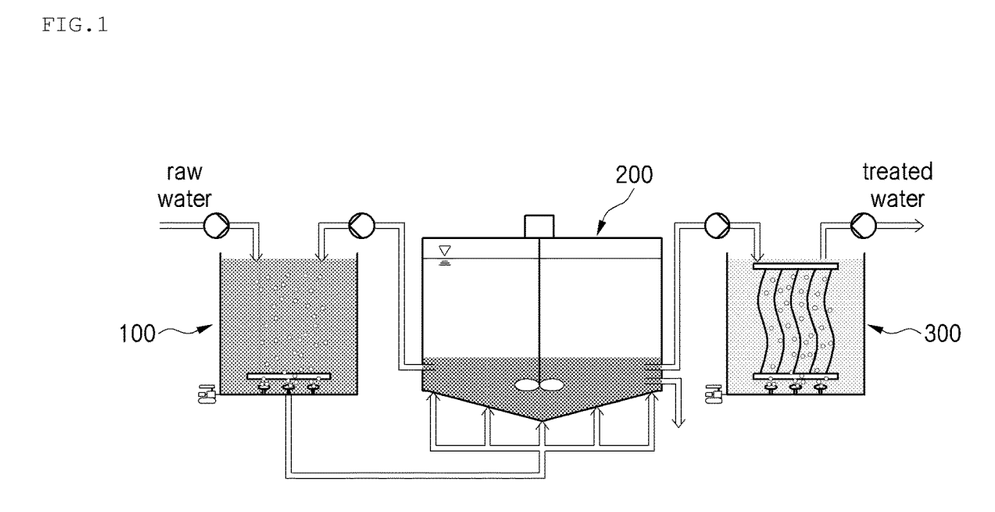
FIG. 1 is a schematic diagram showing a water treatment system in which granular sludge and a membrane bio-reactor are combinedly used.

Referring to FIG. 1 showing a membrane bio-reactor (MBR) in which membranes are submerged into an aerobic tank of an existing activated sludge system, a water treatment system includes: an indirect aeration tank 100 adapted to supply air thereto to allow dissolved oxygen contained in raw water to reach a saturation concentration by a hydrodynamic force applied from the introduced raw water or the return water from a granulation tank 200 and by air supplied therefrom and adapted to be ready for the granulation of pollutants contained in the raw water, so as to remove the pollutants from the raw water; the granulation tank 200 adapted to allow the raw water in which the dissolved oxygen is saturated through the indirect aeration tank 100 to be granulated to the form of sludge; and a filtration tank 300 adapted to take supernatant liquid from the granulation tank 200 except the granulated sludge therefrom, pass the supernatant liquid through membranes, and discharge the supernatant liquid as treated water to the outside.

The membranes disposed in the filtration tank 300 should be periodically cleaned, while being used for a long period of time, because they are contaminated by fine granulated pollutants. Accordingly, an amount of energy consumed is increased, and further, since an aeration device, a pump and a pipe, into which air can be injected, should be disposed in the filtration tank 300 so as to prevent the membranes from being contaminated, an installation cost is also raised.

So as to remove the problems occurring in the membrane bio-reactor in which the membranes are submerged into the aerobic tank of the existing activated sludge system, accordingly, a sewage/wastewater treatment system using granular activated sludge and a membrane bio-reactor according to the present disclosure is configured to allow the pollutants contained in the raw water to be granulated through a granular activated sludge method and effectively remove the granulated pollutants. Further, the treated water is discharged to the outside through movable membranes, thus reducing or minimizing clogging caused when the membranes are submerged, increasing the cleaning period of cleaning for the membranes and the operating period of the membranes, and obtaining advanced treated water.

The sewage/wastewater treatment system using the granular activated sludge and the membrane bio-reactor according to the present disclosure is an advanced continuous flow water treatment system in which an indirect aeration tank and a granulation tank are sequentially arranged, thus improving or optimizing the treatment efficiencies of the pollutants such as organic matters, nitrogen and phosphorus contained in the raw water and reducing or minimizing the volumes of the tanks through short hydraulic staying time. So as to allow solid-liquid separation in post processes to be gently performed in an easy manner, further, the indirect aeration tank and the granulation tank are sequentially arranged, and next, good quality of granular activated sludge is injected into the indirection aerobic tank and the granulation tank, thus performing the water treatment.

The term 'granular activated sludge' means that microorganisms contained in activated sludge bind to each other and are thus granulated by self-granulation according to biological, physical, and chemical factors, without requiring any bio-films including high-priced media, rotor and so on.

The granular activated sludge includes anaerobic granular sludge and aerobic granular sludge which are selectively usable according to the state of the raw water and the operating method of the system, and according to the present disclosure, desirably, the aerobic granular sludge is used. Further, an amount of granular activated sludge is desirably determined through appropriate adjustment of mixed liquor suspended solids MLSS of the granulation tank according to the concentrations of the organic matters and nitrogen contained in the raw water.

Figure 2:
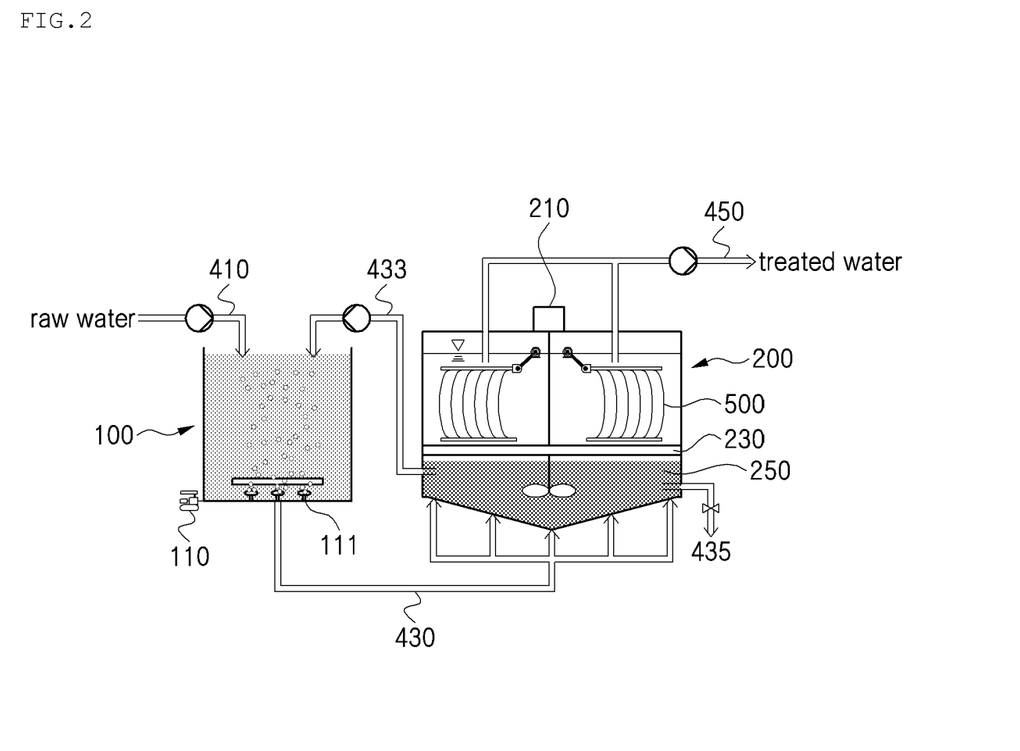
FIG. 2 is a schematic diagram showing a combined sewage/wastewater treatment system using granular activated sludge and a membrane bio-reactor according to a first embodiment of the present disclosure.

FIG. 2 is a schematic diagram showing a sewage/wastewater treatment system using granular activated sludge and a membrane bio-reactor according to a first embodiment of the present disclosure, and in more detail, the sewage/wastewater treatment system according to the first embodiment of the present disclosure includes: an indirect aeration tank 100 adapted to supply air thereto to allow dissolved oxygen contained in raw water to reach a saturation concentration; a granulation tank 200 having a sludge blanket 250 formed therein to allow the pollutants contained in the treated water passing through the indirect aeration tank 100 to be granulated; and movable membranes 500 located on the upper portion of the granulation tank 200 in such a manner as to be movable in the granulation tank 200.

Further, the granulation tank 200 includes an agitator mounted therein to apply given agitating effects to the sludge blanket 250, thus reducing or preventing the sludge blanket 250 from being attached fixedly to the inner wall of the bottom surface thereof.

The indirect aeration tank 100 receives air through an air injection device 110, supplies the air received from the lower side thereof to the upper side thereof through nozzles 111 disposed on the lower portion thereof, and generates upward flows, so that the dissolved oxygen of the raw water introduced through a water introduction line 410 reaches a saturation state.

The air injection device 110 is available with a member used to inject the air used for water treatment, without any limitation, and in this case, the air injection device 110 performs the air injection from the lower side of the indirect aeration tank 100 to the upper side thereof through the nozzles 111, thus allowing the upward flows to be generated in the indirect aeration tank 100.

The raw water in which the dissolved oxygen is in the saturated state through the indirect aeration tank 100 is introduced into the lower portion of the granulation tank 200 through a water conveying line 430, so that the hydrodynamic force caused by the flow of raw water and the agitating force caused by an agitator 210 disposed in the granulation tank 200 are applied to the granular activated sludge to allow the granular activated sludge to collide against each other, thereby making the granular activated sludge granulated by way of gelatin as microorganism reaction by-products. At this time, the granulation tank 200 is formed under an aerobic environment by means of the raw water in which the dissolved oxygen is abundant, and organic matter removal microorganisms and nitrogen component oxidization microorganisms, which use the dissolved oxygen as electron acceptors, become granulated through the hydrodynamic force and the agitating force.

Especially, the granulation in the interior of the granulation tank 200 is carried out by way of the gelatin as the by-products generated by the contacts of floating microorganisms, and the granulation is accelerated through the first hydrodynamic force caused by the treated water conveyed from the indirect aeration tank 100 and the second hydrodynamic force caused by agitation means of the granulation tank 200.

The agitation may be provided by the agitator 210 disposed inside the granulation tank 200 or an auxiliary water circulation line 437 through which the treated water passing through the sludge blanket 250 is circulated again from the upper portion of the granulation tank 200 to the lower portion thereof. The treated water is circulated through the auxiliary water circulation line 437 by way of the force generated by the movements of the movable membranes 500. Through the rotation of the agitator 210, further, the granulation of the granulation tank 200 is accelerated, thus effectively reducing or preventing the sludge blanket 250 from being submergedly attached to the bottom surface of the granulation tank 200.

Accordingly, the second hydrodynamic force is generated by way of the agitator 210 disposed inside the granulation tank 200 or the auxiliary water circulation line 437 adapted to allow the treated water passing through the sludge blanket 250 to be circulated again from the upper portion of the granulation tank 200 to the lower portion thereof.

If the agitator 210 is used for the agitation, the agitator 210 operates by way of a separate motor or power source, but desirably, it may operate by way of a motor for operating the movable membranes 500 disposed inside the granulation tank 200.

At this time, if the rotating speed of the agitator 210 and the moving speed of the movable membranes 500 are not the same as each other, desirably, gears having an appropriate rotational ratio are additionally provided, thereby controlling the agitation speed of the agitator 210 and the moving speed of the movable membranes 500 to optimized values. More desirably, appropriate revolutions per minute of the agitator 210 is in the range of 25 to 40 rpm, and the moving speed of the movable membranes 500 is in the range of 7 to 13 cm/sec.

Through a sludge discharge pipe 435 disposed on the lower side of the granulation tank 200, the amount of granular activated sludge is reduced, and otherwise, the granular activated sludge is discharged to the outside.

The organic matter removal microorganisms granulated under the aerobic condition of the granulation tank 200 oxidize the organic matters and remove them, but the nitrogen component oxidization microorganisms oxidize ammonium nitrogen $NH_4^+$ contained in the raw water into nitrate nitrogen $NO_3^-$ or nitrite nitrogen $NO_2^-$, so that the nitrogen oxides remain at the dissolved state in the raw water. So as to remove the nitrate nitrogen or the nitrite nitrogen and to maintain the concentration of the granular activated sludge in the granulation tank 200, accordingly, a portion of the raw water mixed with the sludge is returned to the indirect aeration tank 100 through a water returning line 433 formed on the upper portion of the sludge blanket 250, which is a mixed layer in which the sludge and the raw water are mixed with each other.

The sewage/wastewater treatment system according to the first embodiment of the present disclosure includes the movable membranes 500 located on the upper portion of the granulation tank 200 in such a manner as to be movable in the granulation tank 200.

Further, the sewage/wastewater treatment system according to the first embodiment of the present disclosure desirably includes a partitioning wall 230 formed to divide the interior of the granulation tank 200, thereby reducing or preventing the turbulent flows generated from the movements of the movable membranes 500 in the granulation tank 200 to be transferred to the sludge blanket 250 and allowing the sludge blanket 250, as the mixed layer in which the granular activated sludge and the raw water in the granulation tank 200 are mixed with each other, to be separated from the supernatant liquid.

Only if the partitioning wall 230 divides the space of the granulation tank 200 into upper and lower portions and at the same time does not block the flow of raw water, it may be freely used, without having any limitation in shape. Desirably, the partitioning wall 230 is formed with a porous member or inclined plates arranged at given intervals. More desirably, the partitioning wall 230 is formed with lamella inclined plates.

The movable membranes 500 located on the upper portion of the granulation tank 200 are movable inside the upper portion of the granulation tank 200 so as to reduce the contamination thereof, and desirably, they are reciprocated forward and backward or left and right. A reciprocating device may be further provided to perform the reciprocating motions of the movable membranes 500.

The reciprocating device includes sliding frames reciprocatingly connected to the membranes, rotors connected to the sliding frames by means of shafts and performing rotational motions, and a low speed motor for rotating the rotors and converting the rotational motions of the rotors into the reciprocating motions of the sliding frames through the shafts connected to the sliding frames.

In more detail, the movable membranes 500 may be low pressure microfiltration MF membranes or ultrafiltration UF membranes, which are used as physical barriers for complete solid-liquid separation, and the movable membranes 500 are mechanically connected to the reciprocating device. The reciprocating device is used to reciprocate the movable membranes 500, and for example, it may be used with a mechanical device for converting the rotational motions into the reciprocating motions.

The movable membranes 500 are continuously reciprocated while the supernatant liquid is being filtered in the granulation tank 200, and if necessary to prevent the contamination of the movable membranes 500, it may be selectively reciprocated.

The movable membranes 500 are connected to the sliding frames, and the rotors driven by the motor are connected to the sliding frames via the shafts. Accordingly, the rotational motions of the rotors can be converted into the reciprocating motions of the sliding frames, and the frequencies and speeds of the reciprocating motions can be controlled by means of the rotational speeds of the rotors. In more detail, the motions of the shafts are generated through the motor, thus converting the rotational motions of the rotors into the reciprocating motions of the sliding frames. The impact loads caused by the reciprocating motions are reduced through buffers provided between the sliding frames and the shafts, and the sliding frames are varied along sliding rails on which linear bearings and shaft-supports are located. According to the present disclosure, of course, the reciprocating device for reciprocating the movable membranes 500 may be used with different kinds of devices providing reciprocating motions.

At this time, the motor moves the movable membranes 500 and at the same time moves the agitator 210 located in the granulation tank 200. In this case, since the movable membranes 500 and the agitator 210 operate with the single motor, the whole installation cost and operating cost of the sewage/wastewater treatment system can be reduced. While the movements of the movable membranes 500 and the rotation of the agitator 210 are being at the same time conducted through the single motor, a connection having appropriate gear ratio is provided on connection portions connected to the shafts so as to appropriately adjust the moving speeds of the movable membranes 500 and the rotational speed of the agitator 210. At this time, of course, a controller is additionally provided so as to monitor and control the operating speeds of the respective components in the sewage/wastewater treatment system.

Figure 3:
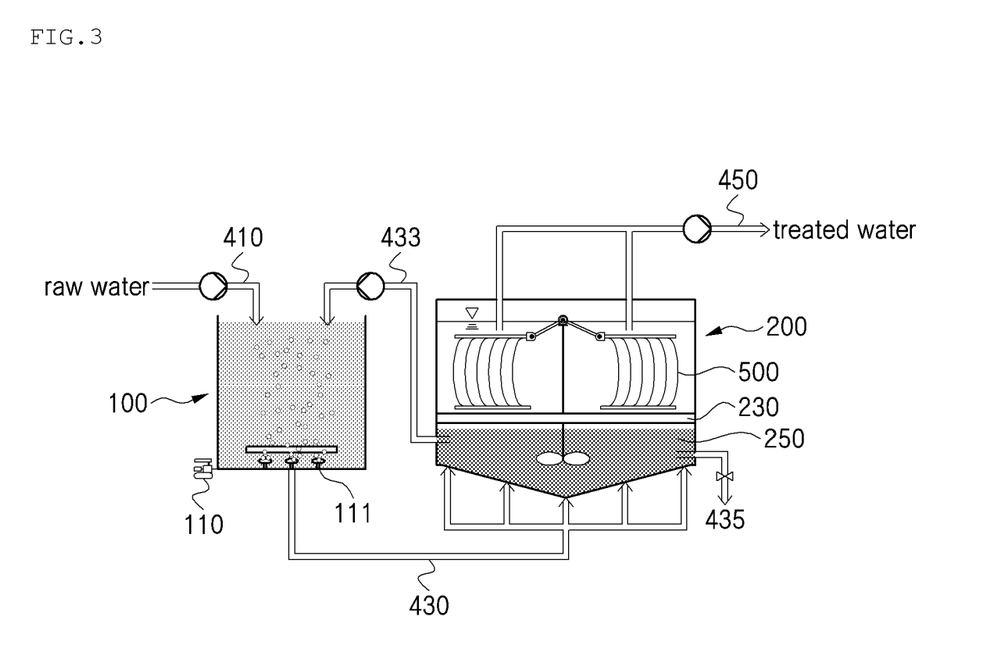
FIG. 3 is a schematic diagram showing a combined sewage/wastewater treatment system using granular activated sludge and a membrane bio-reactor according to a second embodiment of the present disclosure.
Figure 4:
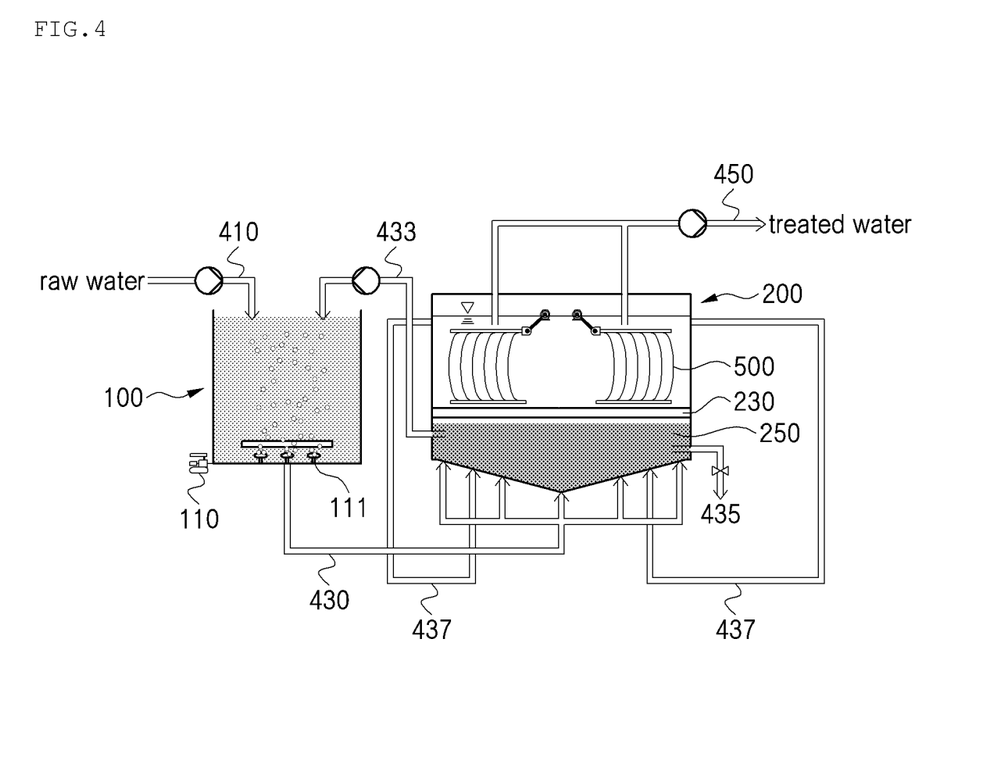
FIG. 4 is a schematic diagram showing a combined sewage/wastewater treatment system using granular activated sludge and a membrane bio-reactor according to a third embodiment of the present disclosure.
Figure 5:
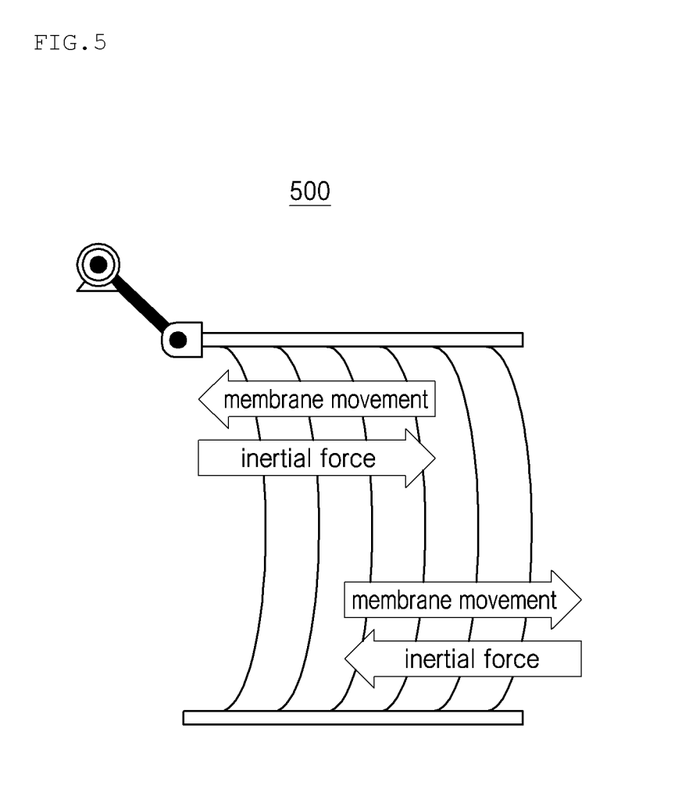
FIG. 5 is a schematic diagram showing the contamination prevention principle of movable membranes disposed in a granulation tank of the combined sewage/wastewater treatment system according to the present disclosure.

Unlike the membranes used in the general MBR as suggested in FIG. 1 to separate the pollutants therefrom through the air bubbles generated by the air injection device, the movable membranes 500 adopted in the present disclosure as shown in FIGS. 2 to 4 are reciprocated at a low speed, thus obtaining excellent cleaning effects through the inertial forces formed in the reverse direction to the moving direction thereof. Accordingly, the contamination of the movable membranes 500 can be continuously reduced or prevented, no air injection device is needed, an installation space is not required separately at the outside to conduct the filtration through the membranes, and the movable membranes 500 are adopted and installed on the existing sewage/wastewater treatment systems.

As mentioned above, FIG. 2 shows the sewage/wastewater treatment system using the granular activated sludge and the membrane bio-reactor according to the first embodiment of the present disclosure, and the sewage/wastewater treatment system according to the first embodiment of the present disclosure includes the indirect aeration tank 100 adapted to supply air thereto to allow the dissolved oxygen contained in the raw water to reach the saturation concentration; and the granulation tank 200 having the sludge blanket 250 formed on the bottom surface of the interior thereof and adapted to allow the floating microorganisms contained in the treated water passing through the indirect aeration tank 100 to be granulated.

At this time, the granulation tank 200 includes the agitator adapted to apply the given agitating effects to the sludge blanket 250 so as to prevent or reduce the sludge blanket 250 from being attached to the inner wall of the bottom surface thereof and the movable membranes 500 located on the upper portion thereof in such a manner as to be movable at the inside thereof.

The granulation tank 200 further includes the partitioning wall 230 located at the inside thereof to divide the internal space thereof into upper and lower portions, and the sludge blanket 250 is formed under the partitioning wall 230. Further, the granulation tank 200 includes the agitator 210 adapted to agitate the sludge blanket 250, and the agitator 210 is connected to the motor to apply the motions of the movable membranes 500, above the partitioning wall 230. The driving motor of the agitator 210 may be provided separately from the motor of the movable membranes 500.

FIG. 3 shows a sewage/wastewater treatment system using granular activated sludge and a membrane bio-reactor according to a second embodiment of the present disclosure, wherein the movements of the agitator 210 and the movable membranes 500 are at the same time conducted by way of the single motor.

FIG. 4 is a schematic diagram showing a sewage/wastewater treatment system using granular activated sludge and a membrane bio-reactor according to a third embodiment of the present disclosure, wherein no agitator 210 is additionally located on the lower portion of the granulation tank 200, and the auxiliary water circulation line 437, as the agitator for the sludge blanket 250, is formed to allow the treated water passing through the sludge blanket 250 to be circulated again from the upper portion of the granulation tank 200 to the lower portion thereof.

Instead of the agitator 210 located on the lower portion of the granulation tank 200, the flow of the treated water is induced through the auxiliary water circulation line 437 formed on the outside of the granulation tank 200 by way of the inertial forces generated from the movements of the movable membranes 500 on the upper portion of the granulation tank 200, so that it is possible that the agitating effects are provided to the sludge blanket 250 and the granulation is accelerated. If the auxiliary water circulation line 437 is adopted, no power is additionally required for the flow of treated water, thus reducing the operating cost.

If it is desired to selectively control the flowing speed of the treated water through the auxiliary water circulation line 437, a low speed motor or a deceleration member may be additionally provided on the auxiliary water circulation line 437.

According to the present disclosure, on the other hand, there is provided a sewage/wastewater treatment method using granular activated sludge and a membrane bio-reactor, the method including the steps of: supplying air to raw water containing pollutants therein to allow the raw water to be aerated; granulating floating microorganisms contained in the treated water in which dissolved oxygen is in a saturated state through the aeration step; and filtering supernatant liquid except the granulated sludge in the granulation step through movable membranes and discharging the supernatant liquid to the outside. In this case, the water treatment is conducted through the water treatment system according to the preferred embodiments of the present disclosure as shown in FIGS. 2 to 4.

In the sewage/wastewater treatment method according to the present disclosure, desirably, the aeration step is conducted wherein the air is supplied to the raw water containing pollutants therein to allow the dissolved oxygen in the raw water to be in the saturated state.

Through the granulation step wherein the floating microorganisms, which are contained in the treated water in which dissolved oxygen is in the saturated state through the aeration step, are granulated, the granular activated sludge is made, so that the organic matters are actively dissolved through the granular activated sludge, thereby obtaining energy, and the organic matters in the raw water are converted into new microorganisms $C_5H_7O_2N$, $CO_2$ and so on through cell synthesis and then removed.

Further, phosphate accumulating organisms PAOs contained in the granular activated sludge dissolve polyhydroxybutyrate PHB stored in cells in aerobic states into oxygen, while taking orthophosphate from the outside, and store it to the form of poly-phosphate in the cells. So as to continuously supply adenosine triphosphate ATP as an energy source needed for synthesis process, an amount of phosphate taken by the PAOs (of which dominant species is *acinetobacter*) from the outside is increased, and the microorganisms having large intake amount of phosphate are separated to the form of floating microorganism from the granular activated sludge and thus discharged together with the aerobic floating microorganisms contained in the raw water. The discharged floating microorganisms are discharged together with the sludge submerged into the lower portion of the granulation tank 200, and accordingly, the phosphate contained in the raw water is finally removed.

The supernatant liquid except the granular activated sludge granulated through the granulation step is then subjected to the filtration step wherein it passes through the movable membranes 500 and is thus discharged as treated water for tap water for miscellaneous.

The internal structures of the movable membrane and the granulation tank have been already described in detail, and accordingly, no explanation on them will be given anymore for the brevity of the description.

According to the present disclosure, therefore, the sewage/wastewater treatment system and method using the granular activated sludge and the membrane bio-reactor are configured wherein aerobic and anaerobic digestion of the granular activated sludge are at the same time conducted, the time for the existing biological treatment is reduced by using excellent submerging capability through the granulation, and the installation area for clarifiers is decreased. Further, the movable membranes are located on the upper portion of the granulation tank, thereby conducting the filtration and discharging at the same time when the granulation is conducted, so that there is no need to additionally install an aeration device, a pump, a pipe and so on so as to conduct membrane filtration and to increase a membrane use period, thereby reducing the installation area, and the period of cleaning of the membranes is extended longer, thereby increasing the operating period and obtaining excellent energy saving effects.

As set forth in the foregoing, the sewage/wastewater treatment system and method using the granular activated sludge and the membrane bio-reactor according to the present disclosure are configured to effectively remove the pollutants contained in the raw water through the granulation tank in which the granular activated sludge is contained and to allow the treated water to be filtered through the movable membranes located on the upper portion of the granulation tank to conduct the advanced water treatment, thereby reducing or minimizing the contamination of the membranes as one of the problems occurring in the conventional biological water treatment system, extending the cleaning period of the membranes, and increasing the operating period of the membranes.

In addition, there is no need to additionally install an aeration device, a pump, a pipe and so on so as to conduct membrane filtration and to increase a membrane use period, thereby reducing the installation area, and the movable membranes are disposed inside the granulation tank, thereby making the whole system small in volume to reduce the installation area and capital expenditure and further decreasing an amount of energy consumed upon the operation of the system to reduce operating expenses.

Moreover, the sewage/wastewater treatment system and method using the granular activated sludge and the membrane bio-reactor according to the present disclosure are configured to have various kinds of agitation means disposed in the granulation tank so as to apply agitating effects to the sludge blanket, thereby preventing the sludge blanket from being attached to the bottom surface of the granulation tank and minimizing the installation cost and the operating cost.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure. The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A raw water treatment system using a granular activated sludge blanket and submerged movable membranes, the system comprising:
   an indirect aeration tank adapted to supply air to the indirect aeration tank and to treat raw water by allowing dissolved oxygen contained in the raw water to reach a saturation concentration;

a granulation tank adapted to allow floating microorganisms contained in treated water passing through the indirect aeration tank to be granulated and form the granular activated sludge blanket in a lower portion of the granulation tank; and the submerged movable membranes located in an upper portion of the granulation tank and adapted to be movable in the upper portion of the granulation tank, wherein the granulation tank includes an agitator adapted to agitate the granular activated sludge blanket using a single motor for driving the submerged movable membranes in the granulation tank.

2. The system according to claim 1, wherein the granulation tank is adapted to produce gelatin as by-product of contact of the floating microorganisms, to apply a first hydrodynamic force caused by the treated water conveyed from the indirect aeration tank, and to apply a second hydrodynamic force caused by the agitator of the granulation tank.

3. The system according to claim 1, wherein the agitator is disposed inside the lower portion of the granulation tank.

4. The system according to claim 1, wherein the submerged movable membranes include microfiltration MF membranes or ultrafiltration UF membranes.

5. The system according to claim 1, further comprising a partitioning wall that divides an interior of the granulation tank into the upper and lower portions.

6. The system according to claim 5, wherein the partitioning wall includes a porous member or inclined plates arranged at intervals.

7. The system according to claim 1, further comprising a reciprocating device adapted to reciprocate the submerged movable membranes in the granulation tank.

8. The system according to claim 7, wherein the reciprocating device comprises:
the single motor;
sliding frames reciprocatingly connected to the submerged movable membranes; and
rotors connected to the sliding frames by rotational shafts,
wherein the single motor is adapted to rotate the rotors and to convert rotational motion of the rotors into reciprocating motions of the sliding frames through the shafts connected to the sliding frames.

9. The system according to claim 8, wherein the reciprocating device further comprises buffers disposed between the sliding frames and the shafts.

10. The system according to claim 8, wherein the sliding frames are varied along sliding rails on which linear bearings and shaft-supports are disposed.

11. The system according to claim 1, wherein the submerged movable membranes are adapted to selectively or continuously move while supernatant liquid in the granulation tank is filtered.

12. A raw water treatment system using a granular activated sludge blanket and submerged movable membranes, the system comprising:
an indirect aeration tank adapted to supply air to the indirect aeration tank and to treat raw water by allowing dissolved oxygen contained in the raw water to reach a saturation concentration;
a granulation tank adapted to allow floating microorganisms contained in treated water passing through the indirect aeration tank to be granulated and form the granular activated sludge blanket in a lower portion of the granulation tank;
the submerged movable membranes located in an upper portion of the granulation tank and adapted to be movable in the upper portion of the granulation tank; and
an auxiliary water circulation line adapted to allow the treated water passing through the granular activated sludge blanket to be circulated again from the upper portion of the granulation tank directly to the lower portion of the granulation tank.

13. The system according to claim 12, wherein the auxiliary water circulation line is adapted to circulate the treated water by a force generated from movements of the submerged movable membranes in the granulation tank.

14. The system according to claim 12, wherein the auxiliary water circulation line is formed on an outside of the granulation tank and includes a motor or deceleration member installed in the auxiliary water circulation line to selectively control a flowing speed of the treated water from the upper portion of the granulation tank to the lower portion of the granulation tank.

15. The system according to claim 12, further comprising a reciprocating device adapted to reciprocate the submerged movable membranes in the granulation tank, the reciprocating device comprising:
sliding frames reciprocatingly connected to the submerged movable membranes;
rotors connected to the sliding frames by rotational shafts; and
a motor that rotates the rotors and converts rotational motion of the rotors into reciprocating motions of the sliding frames through the shafts connected to the sliding frames,
wherein the granulation tank is adapted to apply agitating effects to the granular activated sludge blanket without disposing an agitator in the granulation tank.

* * * * *